US008406682B2

(12) United States Patent
Elesseily et al.

(10) Patent No.: US 8,406,682 B2
(45) Date of Patent: Mar. 26, 2013

(54) VIRTUAL LABORATORY SMART AGENT

(75) Inventors: Tarek Mahmoud Elesseily, Cairo (EG);
Ahmed Kamal-el-din Abo-el-yazid,
Cairo (EG); Ahmed Soliman Farghal,
Cairo (EG)

(73) Assignee: Cloud Niners Information Systems LLC, Cairo (EG)

( * ) Notice: Subject to any disclaimer, the term of this patent is extended or adjusted under 35 U.S.C. 154(b) by 227 days.

(21) Appl. No.: 12/772,134

(22) Filed: Apr. 30, 2010

(65) Prior Publication Data

US 2011/0269111 A1 Nov. 3, 2011

(51) Int. Cl.
G09B 7/00 (2006.01)
(52) U.S. Cl. .......................... 434/362; 434/219; 434/350
(58) Field of Classification Search ................. 434/219, 434/307 R, 322, 336, 350, 362; 719/328
See application file for complete search history.

(56) References Cited

U.S. PATENT DOCUMENTS

| 5,727,950 | A | 3/1998 | Cook et al. | |
| 6,322,074 | B1 * | 11/2001 | Forrest et al. | 273/272 |
| 6,341,960 | B1 | 1/2002 | Frasson et al. | |
| 6,611,822 | B1 | 8/2003 | Beams et al. | |
| 6,690,914 | B2 | 2/2004 | Ramachandran et al. | |
| 6,941,105 | B1 * | 9/2005 | Rowley et al. | 434/350 |
| 7,331,791 | B2 * | 2/2008 | Rowley et al. | 434/224 |
| 2002/0119434 | A1 | 8/2002 | Beams et al. | |
| 2002/0138590 | A1 | 9/2002 | Beams et al. | |
| 2003/0023686 | A1 | 1/2003 | Beams et al. | |
| 2003/0084015 | A1 | 5/2003 | Beams et al. | |
| 2003/0207237 | A1 | 11/2003 | Glezerman | |
| 2007/0166690 | A1 | 7/2007 | Johnson | |
| 2007/0255805 | A1 | 11/2007 | Beams et al. | |
| 2007/0298400 | A1 | 12/2007 | Alabi | |
| 2008/0254434 | A1 | 10/2008 | Calvert | |
| 2009/0208910 | A1 * | 8/2009 | Brueckner et al. | 434/11 |

OTHER PUBLICATIONS

Cao, Weidong et al., Virtual Programming Lab for On-Line Distance Learning, Proceedings of the First International Conference on Advances in Web-Based Learning, Lecture Notes in Computer Science, vol. 2436, Aug. 2002 (8 pages).
Kinshuk, Binglan Han et al., Student Adaptivity in TILE: A Client-Server Approach, Information Systems Department, Massey University, Aug. 2001 (21 pages).

* cited by examiner

*Primary Examiner* — Kang Hu
(74) *Attorney, Agent, or Firm* — Osha Liang LLP

(57) ABSTRACT

A method for conducting a virtual training session with first and second training objectives having first and second validation paths, respectively. The method steps include configuring a virtual machine manipulated by a student to complete the first training objective, configuring a smart agent to execute on the virtual machine including a validator specified by the first validation path, generating a result by performing a first validation check of the virtual training session by at least the validator of the smart agent to identify an event of the virtual machine, identifying, using the smart agent, completion of the first training objective based on the result, and advancing the virtual training session from the first training objective to the second training objective in response to identifying completion of the first training objective.

23 Claims, 6 Drawing Sheets

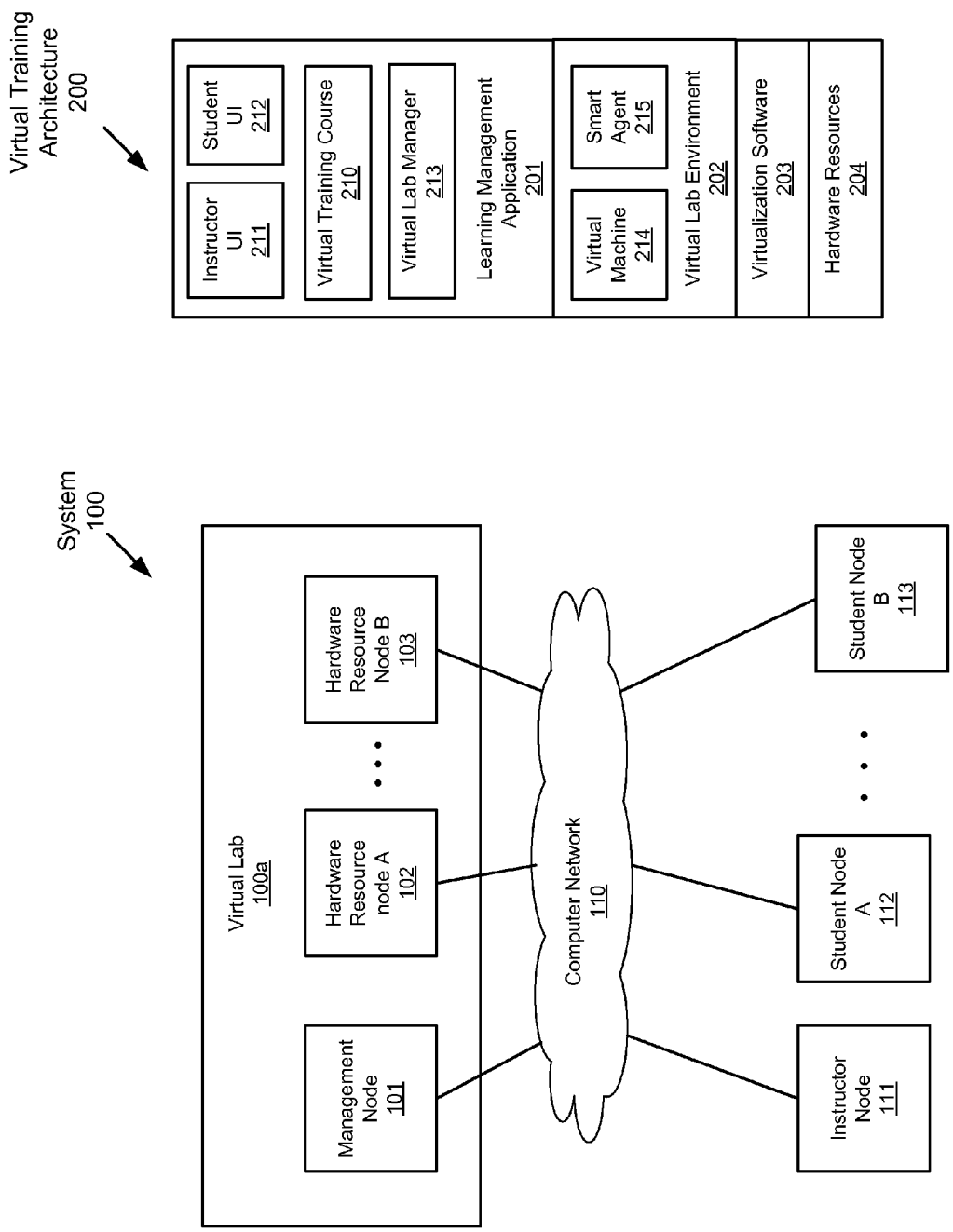

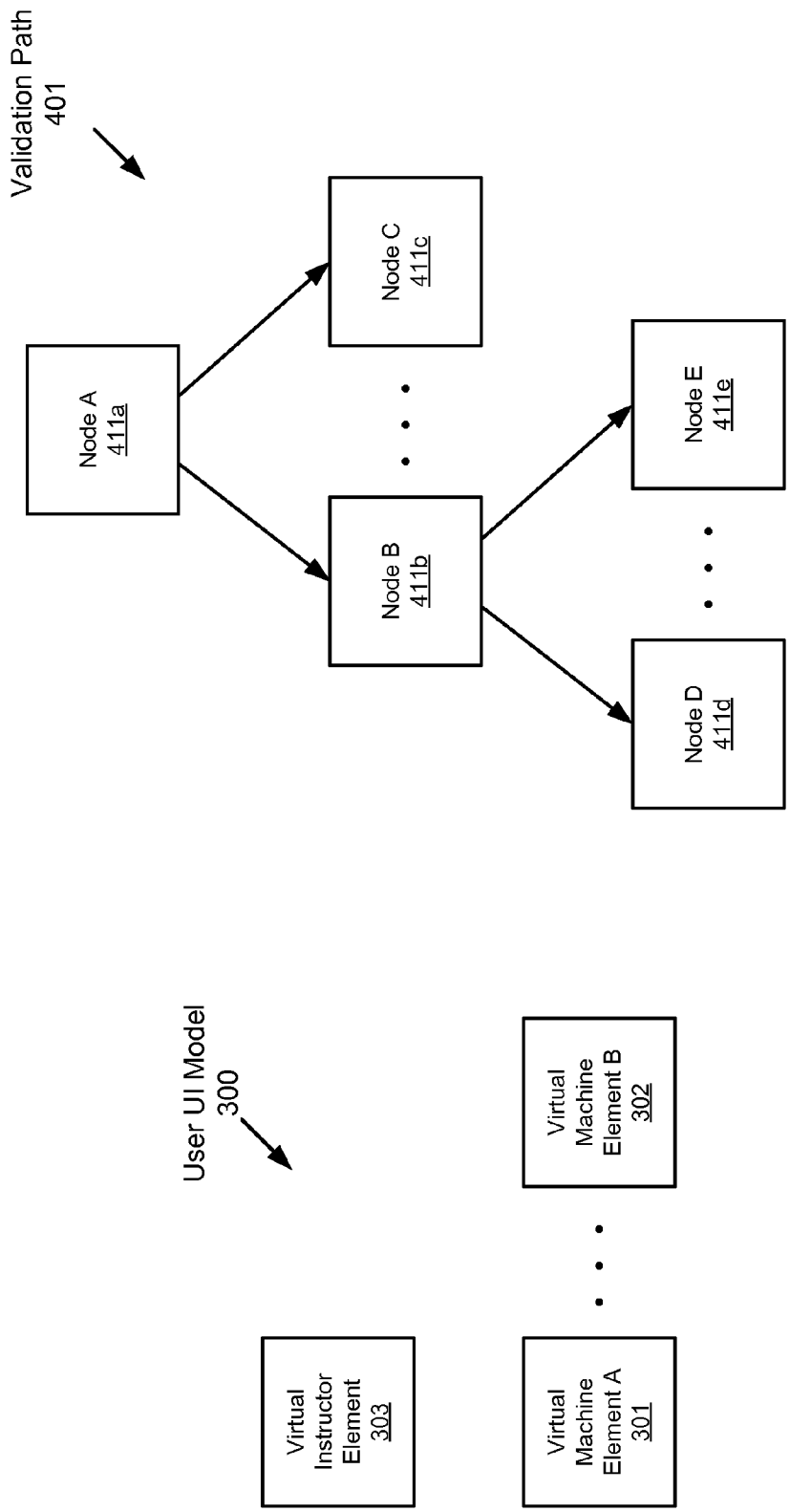

VIRTUAL LABORATORY SMART AGENT

BACKGROUND

A virtual machine (VM) is a software implementation of a physical machine (i.e. a computer) that executes programs in essentially the same manner as the physical machine. One or more VMs may execute on a host machine and share the hardware resources of the host machine. The software layer providing the virtualization is called a virtualization software or hypervisor.

Virtual Laboratory (Lab) Automation refers to a category of software solutions to automate information technology (IT) equipment using virtualization technology. Virtual Lab Automation (VLA) solutions may be used for sales, testing, demos, training, development, and certification of software and hardware solutions.

Virtual training is a training method in which a virtual environment is used. In this environment, a virtual instructor represents a human instructor to explain and/or show certain skills as well as test corresponding abilities of the students (i.e., human students). The simulated virtual environment for conducting virtual training may be based on dedicated computer facilities or based on virtual machines hosted in a virtual lab.

SUMMARY OF THE INVENTION

In general, in one aspect, the invention relates to a method for conducting a virtual training session in a virtual laboratory. The method steps include identifying a virtual training session comprising a first training objective having a first validation path and a second training objective having a second validation path, configuring, using a processor of a computer, a virtual machine in the virtual laboratory to conduct the virtual training session, wherein the virtual machine is manipulated by a student of the virtual training session to complete the first training objective, configuring, using the processor, a smart agent to execute on the virtual machine, wherein the smart agent comprises a validator specified by the first validation path, generating a result by performing a first validation check of the virtual training session, wherein the first validation check is performed by at least the validator of the smart agent to identify an event of the virtual machine, identifying, using the smart agent, completion of the first training objective based on the result, and advancing, using the processor, the virtual training session from the first training objective to the second training objective in response to identifying completion of the first training objective.

In general, in one aspect, the invention relates to a system for conducting a virtual training session in a virtual laboratory. The system includes a hardware resource node configured to implement a virtual machine in the virtual laboratory, and execute a smart agent on the virtual machine, and a management node operatively coupled to the hardware resource node and including a processor and memory storing instructions when executed by the processor comprising functionalities to identify a virtual training session comprising a first training objective having a first validation path and a second training objective having a second validation path, configure the virtual machine to conduct the virtual training session, wherein the virtual machine is manipulated by a student of the virtual training session to complete the first training objective, configure the smart agent to execute on the virtual machine, wherein the smart agent comprises a validator specified by the first validation path, generate a result by performing a first validation check of the virtual training session, wherein the first validation check is performed by at least the validator of the smart agent to identify an event of the virtual machine, identify, using the smart agent, completion of the first training objective based on the result, and advance the virtual training session from the first training objective to the second training objective in response to identifying completion of the first training objective.

In general, in one aspect, the invention relates to a computer readable medium embodying instructions executable by a computer to conduct a virtual training session in a virtual laboratory. The instructions, when executed by the computer, includes functionality for identifying a virtual training session comprising a first training objective having a first validation path and a second training objective having a second validation path, configuring, using a processor of the computer, a virtual machine in the virtual laboratory to conduct the virtual training session, wherein the virtual machine is manipulated by a student of the virtual training session to complete the first training objective, configuring, using the processor, a smart agent to execute on the virtual machine, wherein the smart agent comprises a validator specified by the first validation path, generating a result by performing a first validation check of the virtual training session, wherein the first validation check is performed by at least the validator of the smart agent to identify an event of the virtual machine, identifying, using the smart agent, completion of the first training objective based on the result, and advancing, using the processor, the virtual training session from the first training objective to the second training objective in response to identifying completion of the first training objective.

Other aspects of the invention will be apparent from the following description and the appended claims.

BRIEF DESCRIPTION OF DRAWINGS

FIG. 1 shows a system in accordance with one or more embodiments of the invention.

FIGS. 2A and 2B show virtual training architecture in accordance with one or more embodiments of the invention.

FIG. 3 shows an example student user interface in accordance with one or more embodiments of the invention.

FIGS. 4A and 4B show an example instructor user interface in accordance with one or more embodiments of the invention.

DETAILED DESCRIPTION

Figure 2B:
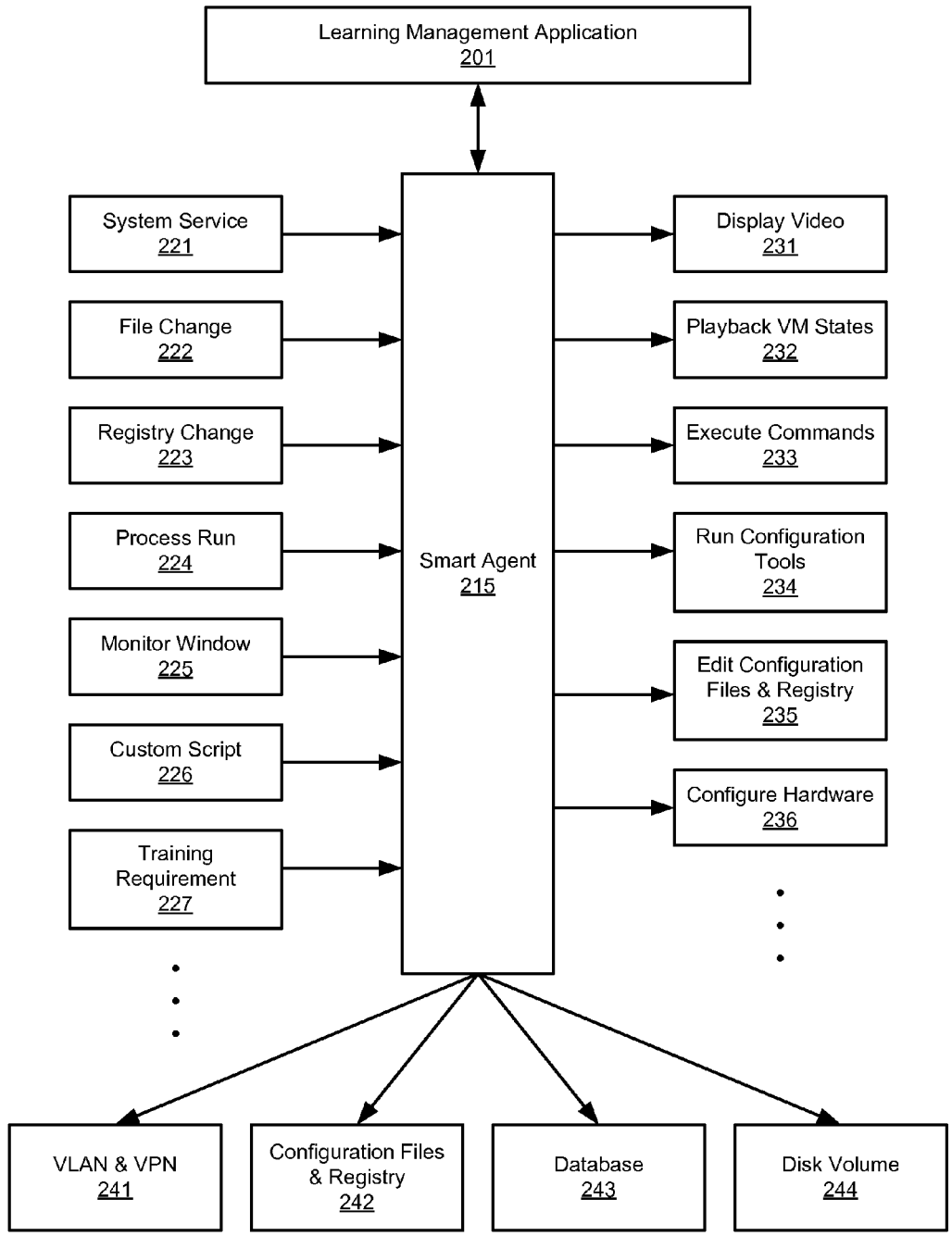

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for conducting a virtual training session during a virtual lab. The virtual lab has one or more virtual machines which effectively duplicate, in software (i.e., emulate), information technology (IT) equipment (e.g., servers, routers, switches, etc.). During the virtual training session, students learn how to configure, operate, and/or troubleshoot the IT equipment by configuring, operating, and/or troubleshooting the virtual machine(s) emulating the IT equipment. Within the virtual lab, a virtual training course includes demos, lessons, exercises, and objective/goals for the student regarding one or more pieces of IT equipment.

FIG. 1 shows a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes instructor node (111), student node A (112), student node B (113) and virtual lab (100a) having management node (101), hardware resource node A (102), and hardware resource node B (103). Each of these nodes includes computer facilities such as one or more portions of the computer system described in reference to FIG. 6 below. For example, the management node (101) may be a computer server configured to perform management tasks (e.g., virtual lab automation) of the virtual laboratory (100a) hosting a collection of virtual machines (not shown). As another example, the hardware resource node A (102) may be a computer server configured to provide processing and/or storage resources of these virtual machines, while hardware resource node B (103) may include dedicated physical hardware devices (e.g., network switch, router, server management card, hardware firewall, etc.). Further, the instructor node (111) may be used by an instructor (i.e., human instructor, not shown) to specify a virtual training session (not shown) of the virtual lab (100a) while each of the student node A (112) and student node B (113) may be used by a student (not shown) to participate in the virtual training session.

In one or more embodiments of the invention, the management node (101), hardware resource node A (102), and hardware resource node B (103) may be connected via computer network (110) and accessed by the instructor node (111), student node A (112), and student node B (113). In particular, the components of the system (100) communicate with each other using network communication protocols known to those skilled in the art. Although a single computer network (110) is shown in FIG. 1, those skilled in the art will recognize that multiple networks with wired and/or wireless segments, point-to-point connections, network gateways, or other suitable coupling configurations may also be used. For example, the computer network (110) may include the Internet, enterprise Intranet, mobile phone service provider network, the public switched telephone network (PSTN), etc.

Although specific numbers of each component of system (100) are shown in FIG. 1, those skilled in the art will recognize that more or less number of each components may be included in system (100).

FIGS. 2A and 2B show virtual training architecture in accordance with one or more embodiments of the invention. In one or more embodiments of the invention, one or more of the modules and elements shown in FIGS. 2A and 2B may be omitted, repeated, and/or substituted. Accordingly, embodiments of the invention should not be considered limited to the specific arrangements of modules shown in FIGS. 2A and 2B.

The virtual training architecture (200) may be implemented using components of the virtual lab (100a) described in reference to FIG. 1 above. As shown in FIG. 2A, the virtual training architecture (200) includes layered components in the sequence of: learning management application (201) having instructor user interface (UI) (211), student UI (212), virtual training course (210), and virtual lab manager (213); virtual lab environment (202) having virtual machines (214) and smart agents (215); virtualization software (203); and hardware resources (204).

In one or more embodiments of the invention, the hardware resources (204) may include the hardware resource node A (102) and/or hardware resource node B (103). The hardware resources (204) are configured to implement the virtual machine (214) and execute smart agent (215) on the virtual machine (214) to form the virtual lab environment (202). In one or more embodiments, the virtual lab environment (202) is implemented via the virtualization software (203) executing on the hardware resources (204). For example, the virtualization software (203) may be a hypervisor, known to those skilled in the art. More details regarding the smart agents (215) are described in reference to FIG. 2B below. Although only one virtual machine (214) and one smart agent (215) are shown in FIG. 2A, additional virtual machines and smart agents may be instantiated (i.e., created by copying), as specified by the virtual training course (210) or as additional students enroll in the virtual training course (210). In one or more embodiments, the specification of the virtual machine (214) is pre-determined in the virtual lab (100a). In one or more embodiments, the specification of the virtual machine (214) is customized based on the requirement of the virtual training course (210).

In one or more embodiments of the invention, the learning management application (201) is configured to execute on the management node (101), instructor node (111), student node A (112), and student node B (113). In one or more embodiments, the learning management application (201) includes the virtual training course (210) that includes a virtual training objective path (e.g., training objective path (420) shown in FIG. 4A below) and administration functionalities for managing enrollment and administrative information. As a student enrolls in the virtual training course (210), an instantiation (i.e., copy) of the virtual training objective path (e.g., training objective path (420)) is created for the student to follow and complete. Each instantiation of the training objective path (e.g., training objective path (420)) is referred to as a virtual training session. Accordingly, the student participates in the virtual training session of the virtual training course (210) in which the student enrolls. In one or more embodiments, the learning management application (201) utilizes the virtual lab environment (202) to conduct simultaneous virtual training sessions for multiple students.

In one or more embodiments, the learning management application (201) includes the virtual lab manager (213), which is configured to execute on the management node (101) and perform various virtual lab management tasks. In one or more embodiments, the virtual lab manager (213) is configured to identify a virtual training session (not shown), configure the virtual machine (214) and/or instantiations thereof to conduct the virtual training session, and configure the smart agent (215) to execute on the virtual machine (214) for monitoring and controlling the virtual training session. More details of the virtual lab manager (213) using the smart agent (215) to manage the virtual training session are described in reference to FIGS. 2B, 4A, 4B, and 5 below.

In one or more embodiments, the learning management application (201) includes the instructor UI (211), which is configured to execute on the instructor node (111) and allows a human instructor (not shown) to specify the virtual training course (210). More details of the instructor UI (211) are described in reference to FIGS. 4A and 4B below.

In one or more embodiments, the learning management application (201) includes the student UI (212), which is configured to execute on the student node A (112) and/or student node B (113) and allows a student (not shown) to participate in the virtual training session. As shown in FIG. 3, an example model of the student UI (212) includes graphical UI elements such as virtual instructor element (303), virtual machine element A (301), and virtual machine element B (302). For example, the virtual instructor element (303) may include activation buttons (not shown) and data entry/display fields (not shown) that provide functionalities for the student to interact with (e.g., ask a question to and receive a hint from) a virtual instructor. Each of the graphical UI elements virtual machine element A (301) and virtual machine element B (302) may include action buttons (not shown) and data entry/display fields (not shown) that allow the student to manipulate various machine functionalities specified by the virtual training course (210). For example, the student may be able to configure IP addresses of the virtual machines via the virtual machine element A (301) when the subject of the virtual training course (210) is IP configuration training. In another example, the student may be able to install server software on a virtual server machine via the virtual machine element A (301) and install client software on a virtual client machine via the virtual machine element B (302) when the subject of the virtual training course (210) is client server configuration training.

FIG. 2B depicts functionalities of the smart agent (215). Generally speaking, the smart agent (215) embeds the intelligence and expertise of the human instructor in the virtual lab environment (202). As shown in FIG. 2B, the smart agent (215) is configured within the learning management application (201), for example, by the virtual lab manager (213). In one or more embodiments of the invention, the smart agent (215) or an instantiation thereof is automatically deployed to each virtual machine (e.g., virtual machine (214)) in the virtual lab (100a) and reports back virtual machine information. In one or more embodiments, the smart agent (215) is pre-installed on the virtual machine (214). In such embodiments, when a virtual machine (e.g., virtual machine (214)) is instantiated in the virtual lab environment (202) to conduct a virtual training session, an instantiation of the smart agent (215) is readily available and communicating with the virtual lab manager (213). In one or more embodiments, the smart agent (215) is installed on demand. For example, the virtual lab manager (213) may connect to the virtual machine (214) or an instantiation thereof to install and start the smart agent functionally during the virtual training session.

In one or more embodiments, the smart agent (215) is configured to monitor, under control of the virtual lab manager (213), various components of the virtual machine (214), such as VLAN (virtual local area network) & VPN (virtual private network) (241), configuration files & registry (242), database (243), and disk volume (244). In one or more embodiments the smart agent (215) may configure or reconfigure, under control of the virtual lab manager (213), underlying hardware resources of the virtual machine (214) based on certain result identified during the virtual training session. For example, the hardware resources of the virtual machine (214) may be reverted to a previously captured snapshot. In another example, the configuration of a physical hardware device connected to the virtual machine (214) may be modified. Those skilled in the art, with the benefit of this disclosure, will recognize other types of virtual machine components may also be monitored and/or modified using the smart agent (215).

In one or more embodiments, the smart agent (215) is configured to monitor, under control of the virtual lab manager (213), activities of the virtual machine (214) to identify various events, such as occurrence and/or execution of system service (221), file change (222), registry change (223), process run (224), monitor window (225), custom script (226), and training requirement (227). Those skilled in the art, having the benefit of this detailed description, will recognize other types of virtual machine events may also be identified using the smart agent (215). In one or more embodiments, each of the aforementioned events is identified by specific validator components of the smart agent (215). More details of the validator components are described in reference to FIGS. 4A and 4B below.

In one or more embodiments, the smart agent (215) is configured to initiate, under control of the virtual lab manager (213), an operation of the virtual machine (214), such as playing back virtual machine state (232), executing commands (233), running configuration tools (234), editing configuration files and registry (235), and configuring hardware (236). In one or more embodiments, the smart agent (215) is configured to initiate, under control of the virtual lab manager (213), provide education units (e.g., videos, documents, discussions, etc.) based on the user progress towards the training session objectives. For example, instruction video may be displayed (231) via user graphical interface on a student node (e.g., student node A (112), student node B (113)).

In one or more embodiments, the smart agent (215) executing on a hardware resource node connected to dedicated hardware devices (e.g., network switch, router, hardware firewall, etc.) is configured to utilize each hardware device's native set of remote management features. Such remote management features may include Intelligent Platform Management Interface (IPMI) and Remote System Connection (RSC) for servers, management port connectivity for hardware devices supporting standard protocols (e.g., RS232), custom cable connection to other hardware device such as field programmable gate array (FPGA) modules, other hardware specific management software, etc.

For example based on the aforementioned functionalities, the smart agent (215) may detect a progression of the virtual machine (214) into a critical state following manipulation of the virtual machine (214) by the student during the virtual training session. In response to detecting the progression of the virtual machine into the critical state, the smart agent (215) may issue an instruction to the student, initiate an operation of the virtual machine (214), or modify a configuration of an underlying hardware resource of the virtual machine (214). In addition, the smart agent (215) may generate a template of the virtual machine (214) during the virtual training session. More details of the virtual machine template are described in reference to FIG. 4A below.

Figure 4A:
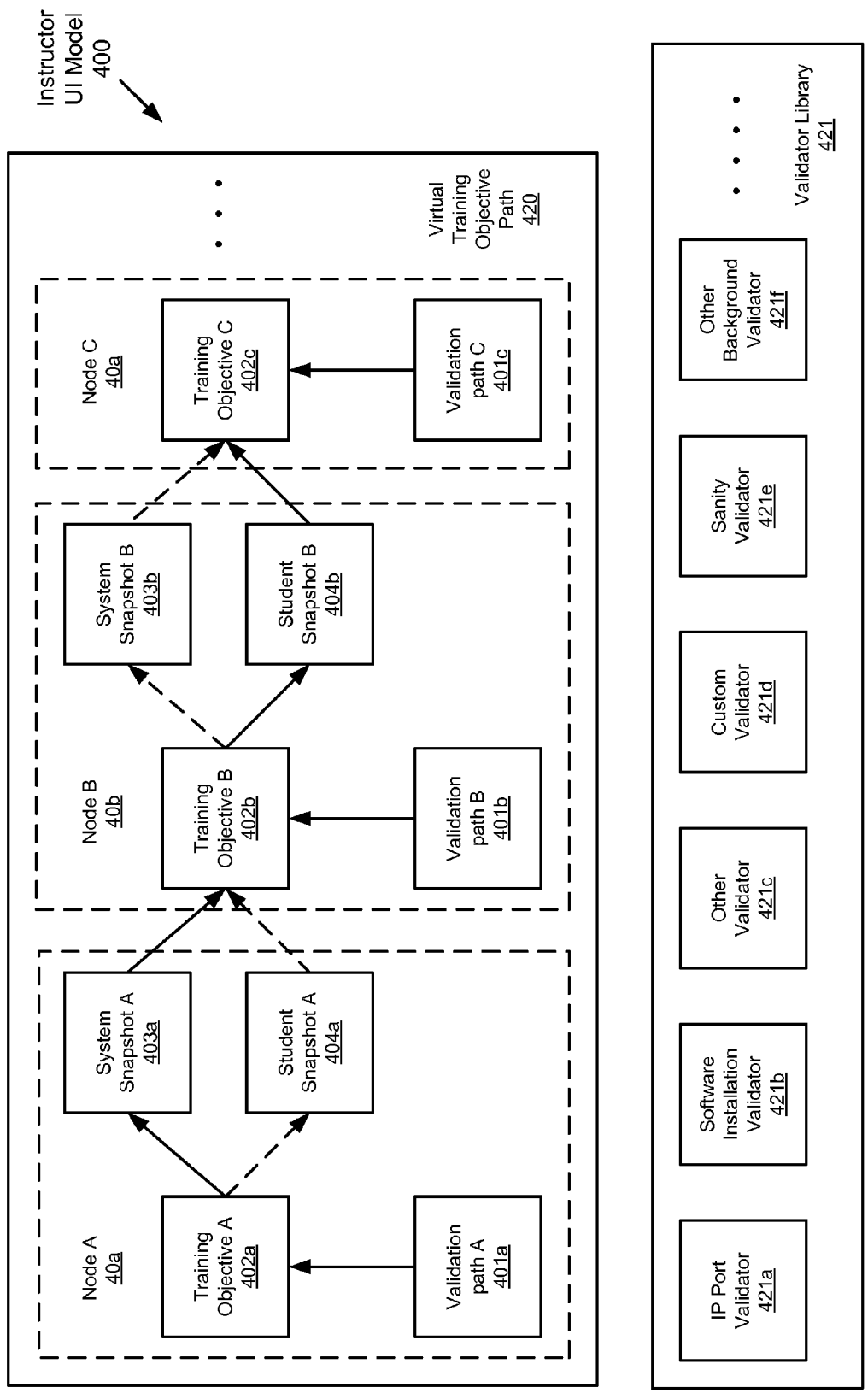

FIGS. 4A and 4B show an example instructor user interface in accordance with one or more embodiments of the invention. In one or more embodiments, the instructor specifies the virtual training objective path (e.g., virtual training objective path (420)) of the virtual training course (210) by placing graphical icons into a graph (e.g., having node A (40a), node B (40b), and node C (40c)) displayed on a display device (not shown) of the instructor node (111).

As shown in FIG. 4A, the instructor is provided with graphical icons representing training objective (e.g., training objective A (402a), training objective B (402b), and training objective C (402c)), validation path (e.g., validation path A (401a), validation path B (401b), validation path C (401c)), and virtual machine template (e.g., system snapshot A (403a), student snapshot A (404a), system snapshot B (403b), student snapshot B (404*b*)). Further as shown in FIG. 4A, the validator library (421) includes graphical icons representing a collection of pre-defined validators (e.g., IP port validator (421*a*), software installation validator (421*b*), other validator (421*c*), custom validator (421*d*), sanity validator (421*e*), other background validator (421*f*), etc.).

As shown in FIG. 4B, the validation path (401) (e.g., representing any of the validation path (401*a*), validation path B (401*b*), and validation path C (401*c*))) may be specified by the instructor using a graph having nodes (i.e., node A (411*a*), node B (411*b*), node C (411*c*), node D (411*d*), node E (411*e*)) each of which is an aforementioned validator that is selected from the validator library (421). The parent-child relationships of nodes in the graph represent dependency of corresponding validators. For example, the custom validator (421*d*) may be configured to check whether certain software has been configured by the student correctly. In such case, the custom validator (421*d*) may only be placed in the validation path (401) as a child node to the software installation validator (421*b*) configured to confirm that such software has already been installed. In one or more embodiments of the invention, the validation path (401) represents the path of checks traversed by the smart agent (215) to monitor (i.e., determine the status of) a virtual training session of the virtual training objective path (420). In one or more embodiments of the invention, multiple validation paths (e.g., validation path (401*a*), validation path B (401*b*), and validation path C (401*c*)) may be attached to a virtual training objective path (e.g., virtual training objective path (420)).

In one or more embodiments, a validator may be associated with a hint. For example, the IP port validator (421*a*) may be configured to check whether a certain port is reachable. When the port is not reachable, the hint associated with the IP port validator (421*a*) is communicated back to the virtual lab manager (213) in response to a student's request for help. In one or more embodiments, the hint includes a static message attached to the validator as defined by the instructor (or course designer). For example, the static message may be displayed to the user in case of failure detected by the validator. In one or more embodiments, the hint may be a context-aware message that is dynamically generated by the smart agent using logic attached to the validator as defined by the instructor (or course designer). For example, the logic may be defined via the instructor user interface (211) and allows the hint to be generated based on characteristics of the failure before displayed to the user.

In one or more embodiments, a validator may include a dialog box for the instructor to specify an attribute of the validator. For example, the instructor may use the dialog box to specify the IP port to be checked by the IP port validator (421*a*) or the virtual machine to be checked by the software installation validator (421*b*). In other examples, the dialog box may be used to configure other validators for checking whether an IP address associated with a virtual machine is available or accepting connections, whether operating service is running on a virtual machine, whether a mail box exists on an email server, whether an email server can receive emails, etc.

In the description above, the virtual training objective path (420) depicted in FIG. 4A represents a graph of graphical icons displayed on the instructor node (111), as described above. In addition, the virtual training objective path (420) depicted in FIG. 4A is essentially a schematic diagram of the virtual training objective path portion of the virtual training course (210).

In one or more embodiments, the training objective A (402*a*), training objective B (402*b*), and training objective C (402*c*) include questions and/or requirements to be answered or completed by the student. Each training objective may contain multiple sub-components and questions and may be associated with one or more attributes. In one or more embodiments, the attributes include a tag relating a question to a specific category via which related help topics may be displayed. In one or more embodiments, the attributes include a link to sections in training material related to the training objective. In one or more embodiments, the attributes include level of difficulty and expected time to complete.

In one or more embodiments of the invention, the student has the option to request a hint for the question associated with the training objective. As described above, each training objective is associated with a validation path for determining the successful completion of the training objective. Accordingly, the student advances from the completed training objective to the next training objective in the virtual training objective path (420). In one or more embodiments, the student receives a notification when a training objective or a portion thereof has been completed.

In one or more embodiments, advancing from a training objective to the next is via a virtual machine template (e.g., system snapshot A (403*a*), student snapshot A (404*a*), system snapshot B (403*b*), student snapshot B (404*b*)). The virtual machine template is a system configuration (i.e., a copy of the state of the virtual machines) deployed in the virtual training session.

In one or more embodiments, the virtual machine template is a system snapshot (e.g., system snapshot A (403*a*), system snapshot B (403*b*), system snapshot C (403*c*)) defined by the instructor in the virtual training course (210). For example, when the student has completed the training objective A (402*a*), the changes to the virtual machines made by the student to complete the training objective A (402*a*) are discarded and the state of the virtual machines is advanced to the system snapshot A (403*a*). The virtual machines are in a known state and ready for the student to work on completing the training objective B (402*b*). This case is represented by the solid lines connecting the training objective A (402*a*), the system snapshot A (403*a*), and the training objective B (402*b*). An alternative case using student snapshot A (404*a*) is represented by the dashed lines connecting the training objective A (402*a*), the student snapshot A (404*a*), and the training objective B (402*b*). In one or more embodiments, the state of the virtual machine may be captured into a system snapshot (e.g., when the system state is not modified by the student) and/or a student snapshot (e.g., when the system state has been modified by the student) in response to student input. For example, this may allow snapshots to be generated at any point in the virtual training session in addition to the completion of the training objectives.

In one or more embodiments, the virtual machine template is a student snapshot (e.g., student snapshot A (404*a*), student snapshot B (404*b*), and student snapshot C (404*c*)). For example, when the student has completed the training objective B (402*b*), the changes to the virtual machines made by the student to complete the training objective B (402*b*) are preserved by automatically capturing the virtual machines state in the student snapshot B (404*b*). This case is represented by the solid lines connecting the training objective B (402*b*), the student snapshot B (404*b*), and the training objective C (402*c*). An alternative case using system snapshot B (403*b*) is represented by the dashed lines connecting the training objective B (402*b*), the system snapshot B (403*b*), and the training objective C (402*c*).

In one or more embodiments, the sanity validator (421*e*) and/or other background validator (421*f*) are configured to execute in the background. For example, the sanity validator (421e) and/or other background validator (421f) may be specified based on custom script (226) (shown in FIG. 2B) defined by the instructor. In one or more embodiments, the sanity validator (421e) and/or other background validator (421f) are configured to verify that virtual machines and connected hardware are intact (i.e., not corrupted) and that the student has not destroyed the virtual machines (i.e., rendered the virtual machine state irresolvable). In one or more embodiments, the criteria to determine whether the state of the virtual machine is still intact are defined by the instructor.

In one or more embodiments, the sanity validator (421e) and/or other background validator (421f) communicate detected corruption status to the virtual lab manager (213) executing on the management node (101). Accordingly, the student is notified and asked whether he/she would like to revert back to a known system snapshot. For example, the background validator (421f) may include a TCP-keep-alive connection and a watch-dog-timer (i.e., heartbeat) allowing the management node (101) to detect communication failures with the smart agent (215) indicating failure of the smart agent (215). In case of such failure, the management node (101) may restart the smart agent, restart the virtual machine, restart a group of virtual machines, or revert one or more virtual machines to previous snapshots (215) from a previous snapshot upon notifying the user and obtaining user permission.

A real life usage scenario based on FIG. 4A is described below where the student follows the virtual training objective path to walkthrough the process of configuring a sample IT lab. The overall training objective to be achieved by the student is to install a web server on virtual machine A, connect to the web server from a web browser on virtual machine B, and display the default welcome page. In this example, the virtual training objective path includes the nodes described below where training objectives are displayed to the student who is notified upon completing each of the training objectives before advancing to the next training objective till the overall training objective is completed.

The training objective A (402a) is to assign virtual machine A an IP address. The validation path A (401a) is configured to check whether virtual machine A has IP=x.x.x.x and includes a hint "Machine A needs an IP to be assigned. You can use the "ifconfig" command to assign an IP." The example command "ifconfig" and other content of the example hint are relevant to a Linux machine and are for example only. Other example hint may include different content and/or commands based on the operating systems.

The training objective B (402b) is to assign virtual machine B an IP address. The validation path B (401b) is configured to check whether virtual machine B has IP=y.y.y.y and includes a hint. "Machine B needs an IP to be assigned. You can use the network icon under Windows' control panel to reach the network card's TCP/IP properties to assign an IP. Click HERE for a video demonstrating how to assign a Windows machine an IP address."

The training objective C (402c) is to install web server software on virtual machine A. The validation path C (401c) is configured to check whether web server is installed on virtual machine A and includes a hint. "The Web server software is not installed. You can use the following command to install it, rpm-ivh/srv/rpms/httpd*.rpm."

The training objective D (not shown) is to start a web server on virtual machine A. The validation path D (not shown) is configured to check whether the web server is started on virtual machine A and include a hint. "The Web server software is not started. You can use the following command to start it, service httpd start."

The training objective D (not shown) is to start a web server on virtual machine A. The validation path D (not shown) is configured to check whether a browser on virtual machine B can connect to web server on virtual machine A and includes a hint #1: "Although the web server is running, a web client on machine B is unable to connect. Please insure the firewall on machine A is allowing inbound connections to port 80" and a hint #2: "To completely stop the firewall, you can use the following command "service iptables stop"."

Based on the virtual training objective path (420) specified as above, the following describes an example scenario of the student activity during the virtual training session. In this example scenario, the student connects to the console of virtual machine A and uses "ifconfig" command to assign the designated IP address. Accordingly, the student receives an indication that the first training objective is complete (e.g., by changing icon color or flashing a message) and is allowed to advance to the next stage.

In the next stage, the student connects to the console of virtual machine B and uses the network icon to assign the designated IP address. Accordingly, the student receives an indication that the second training objective is complete (e.g., by changing icon color or flashing a message) and is allowed to advance to the next stage.

In the next stage, the student installs the web server software but does not use the command suggested in the hints Instead the student double clicks the file and follows a graphical installer. Accordingly, the student receives an indication that the third training objective is complete (e.g., by changing icon color or flashing a message) and is allowed to advance to the next stage.

In the next stage, the student starts a web browser on virtual machine B and makes repeated attempts to connect to the web server without being able to establish the connection. The student clicks the GUI to request a hint. In response, the validator detects that the web server software has not been started yet and communicates the information back to the virtual lab manager (213), which instructs the smart agent (215) to flash the previously mentioned hint (i.e., the web server needs to be started) message to the student.

Seeing the flashing message, the student starts the web server. The validator detects the server software is now running. Accordingly, the student receives an indication that the fourth training objective is complete (e.g., by changing icon color or flashing a message) and is allowed to advance to the next stage.

In the next stage, the student makes an attempt to connect once more, but still fails repeatedly. The student requests another hint, and this time uses the command suggested in the hint to disable the firewall on virtual machine A. The student makes another attempt to connect with success and is able to connect and see the welcome page. As a result, the validator detects the web server is now reachable from virtual machine B. Accordingly, the student receives an indication that the fifth and final training objective is complete (e.g., by changing icon color or flashing a message).

Figure 5:
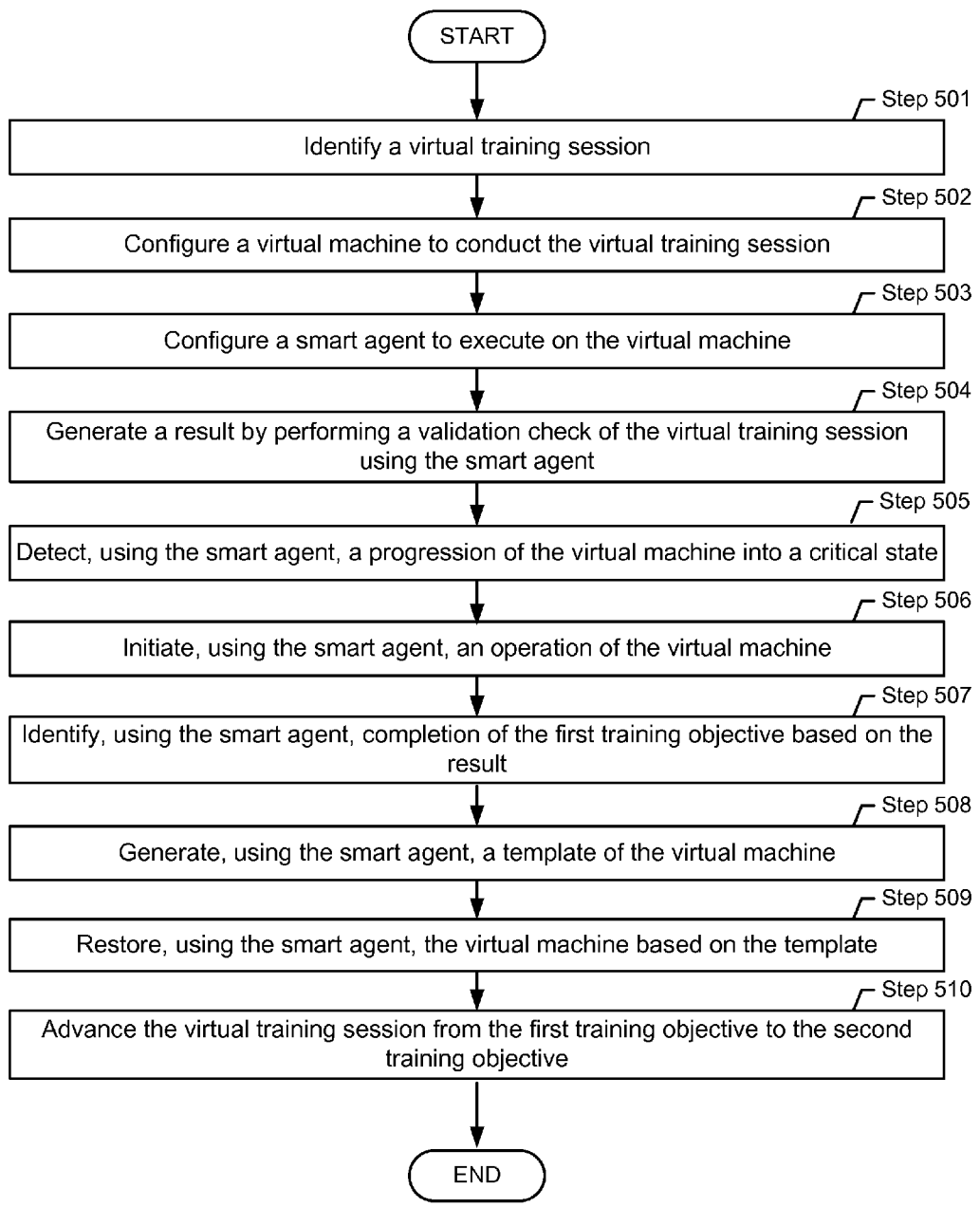
FIG. 5 shows a flowchart in accordance with one or more embodiments of the invention.

FIG. 5 shows a flowchart in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangements of steps shown in FIG. 5.

The method depicted in FIG. 5 may be practiced using system (100) described above with respect to FIG. 1 and virtual training architecture (200) described above with respect to FIGS. 2A and 2B. Initially in Step 501, a virtual training session is identified that includes a first training objective having a first validation path and a second training objective having a second validation path. In one or more embodiments of the invention, the training objectives are defined in a virtual training objective path specified by a human instruction as a graph of training objective nodes. Each training objective node is associated with a validation path specified by the human instruction as a graph of validator nodes, which are selected from a validator library.

In Step 502, a virtual machine is configured in the virtual laboratory to conduct the virtual training session where the virtual machine is manipulated by a student to complete the first training objective. In one or more embodiments, the virtual machine may include a virtual local area network, virtual private network, configuration file, registry entry, database, disk volume, etc.

In Step 503, a smart agent is configured to execute on the virtual machine In one or more embodiments, the smart agent includes a validator specified by the validation paths for performing validation checks to identify an event of the virtual machine. For example, the event may include a system service, file change, registry change, process run, monitor window, training requirement, etc. In one or more embodiments, the validator may be dynamically configured in the smart agent. For example, the validator may be sent in real time to the smart agent based on the student request for hint or based on periodic check of student's progress. In one or more embodiments, the validator is sent via a secure channel to the smart agent to ensure the integrity of the check. For example, the student is prevented from tempering with the validation process.

In Step 504, a result is generated by performing a first validation check of the virtual training session. In one or more embodiments, the result may indicate whether a state of the virtual machine is consistent with a pre-defined configuration (e.g., as specified by the human instructor) and/or whether an answer of the student to a question satisfies a pre-defined standard (e.g., as specified by the human instructor).

In Step 505, the virtual machine is detected, using the smart agent, as progressing into a critical state following manipulation of the virtual machine by the student to meet the first training objective. In one or more embodiments, the critical state is specified by the human instructor. For example, the critical state may be associated with the integrity of a portion of the virtual machine being compromised.

In Step 506, an operation of the virtual machine is initiated using the smart agent. In one or more embodiments, the operation is initiated based on the result. In one or more embodiments, the operation is initiated in response to detecting the progression of the virtual machine into the critical state. In one or more embodiments, the operation may include virtual machine state playback, executing a command, running a configuration tool, modifying a file, modifying a registry, modifying a database, modifying a disk volume, a configuration of an underlying hardware resource of the virtual machine, etc. In one or more embodiments, an instruction may be issued to the student based on the result and/or in response to detecting the progression of the virtual machine into the critical state.

In Step 507, completion of the first training objective is identified using the smart agent based on the result. As described above, the completion may be identified based on a state of the virtual machine being consistent with the pre-defined configuration and/or an answer of the student to a question satisfying the pre-defined standard. Upon completion of the first training objective, the state of the virtual machine may include student modifications as a result of the student manipulating the virtual machine to complete the first training objective. In Step 508, the student modified state of the virtual machine is automatically captured by the smart agent.

In Step 509, the virtual machine is restored, using the smart agent, based on a template allowing the virtual machine to be manipulated by the student to complete the second training objective after restoring. In one or more embodiments, the template is a system configuration (e.g., as specified by the human instructor) based on the virtual training session. In one or more embodiments, the template is the student modified state of the virtual machine captured by the smart agent.

In Step 510, the virtual training session is advanced to the second training objective, based on the restored virtual machine, in response to identifying completion of the first training objective. In one or more embodiments, the student is notified before the advancement of the virtual training session. For example, the advancement to the second training objective may be based on receiving a student activation (e.g., via a "next" button of the student UI).

The following describes an example application of the smart agent in a virtual training session. In this example, the smart agent continuously performs background sanity checks, making sure the virtual lab has not been damaged beyond repair. In case the virtual lab environment executing on the hardware resource node has been seriously damaged, the smart agent communicates back to the virtual lab manager executing on the management node, which in turn takes appropriate actions (e.g., informing the user or performing automatic corrective actions as specified in the virtual lab environment or specified in the virtual training course by the human instructor).

The background sanity checks may include various checking function to verify whether (i) a disk volume still exists; (ii) certain data storage on a volume still exists; (iii) a specific database structure is still intact; (iv) critical configuration files and values have not been corrupted; (v) a specific network configuration (VLAN, VPN) is intact; (vi) a pre-defined test script still returns the expected value, etc.

The smart agent may also continuously monitor the student actions and report to an expert system (ES) module of the virtual lab manager executing on the management node. Methods of detecting and monitoring student actions may include exposing a special command line terminal through a web UI and a client side program as a shell so that the student may use the shell to pass commands to the learning management application. The smart agent then intercepts and interprets the commands before passing to the virtual lab manager. Accordingly, the smart agent enables various monitoring activities such as (i) allowing direct command line access to learning management application while sniffing the text being entered in real time; (ii) monitoring which processes are being run by the student; (iii) monitoring which windows appear on the screen of the student node; (iv) continuously monitoring file access and configuration variable changes within configuration files; (v) continuously monitoring registry hive access; (vi) running background tasks that are continuously checking whether or not the student has achieved a specific sub-task, and to which direction the student has decided to navigate the virtual training session, etc. For example in a IP configuration training session, such monitoring activities generates status information such as (i) whether a particular IP address is now reachable; (ii) whether a particular port is now reachable; (iii) whether the student has opened configuration file X; (iv) whether the student is working on component X while he should be working on component Y prior to working on component X, etc.

In this example, the ES of the virtual lab manager utilizes internal heuristics as well as virtual training course specific intelligence/scripts to determine the status of the virtual training session and provide appropriate actions such as:

(i) Detect that specific training (sub)requirements have been met, indicating that to the student, or causing further configuration changes to be taken inside the virtual training environment.

(ii) Detect that the student is in need of a "hint", for example when the ES detects the student is attempting to configure component X and has been unable to achieve that requirement for a particular amount of time. ES then provides the needed information either through the student UI, or as internal messages displayed inside the virtual machine.

(iii) Detect that the student is in need of further help, for example based on lack of progress after hints have been provided and that hints have not been helpful. The ES then offers active help by offering to perform a specific task/requirement on behalf of the student. Such automated help may include:

(a) Playing a video demonstrating how to perform the needed task.

(b) Advancing the state of the virtual machine by playing back recorded instruction stream, such that the state of the virtual machine is progressing and the tasks are being achieved while being viewed by the student. This is very similar to playing a video, however, in this case, it is not a pre-recorded movie, and rather the virtual machine is playing back pre-recorded 10 and CPU instructions resulting in a simulation of a student resolving the problems.

(c) Displaying and optionally executing a system command to perform the needed task.

(d) Automatically launching the configuration tool, opening windows, and clicking buttons to guide the student to perform the needed task.

(e) Performing automated file/registry modifications, and showing the end result to the student.

(f) Detect that the student is about to enter into a critical scenario, where previous work may be destroyed. The ES then decides to intervene and recommending a system snapshot being captured manually or actively and automatically performs a complete/partial system snapshot. For example, the snapshot includes all necessary system parameters for a complete system restore. The capturing of the automatic snapshot may be indicated in the student UI or displayed on the virtual machine.

(g) Offer to correct the previously detected incorrect changes by restoring a previously captured virtual machine state, or by directly reverting changes.

In case the training involves the student creating a system (e.g. computer program, VHDL (very-high-speed integrated circuit hardware description language) description of an electric circuit, Matlab® (a registered trademark of Mathworks, Inc., Natick, Mass.) system simulation, etc.) as part of resolving a problem or meeting a requirement. The student would be allowed to enter his creation (e.g., program code, VHDL code, Matlab® code, etc.) through required tools executing on the virtual machine, or directly through a web integrated editor (e.g. entering program code directly in a web editor). The system would then automatically transfer the program code to a backend cluster of servers which perform the following:

(a) Detect the student has performed syntactically incorrect or logically incorrect changes, and alert the student, for example via the student UI or the virtual machine display.

(b) Run/test the system with student changes and decide whether a specific requirement has been met, for example whether the student's code is working as expected (e.g., returning the expected output stream) and/or resolving the specific requirement.

(c) Perform performance evaluation and inform the student about the relative speed/quality of the work, as well as offering incremental advices for improving performance. For example, the performance evaluation may indicate whether the student's code executes fast enough to satisfy the standard timing specified by the human instructor.

(d) Provide integration hook points inside the software being used for training (example Oracle DB, Apache Web-Server . . . etc), such that the Management node and ES are able to continuously query/monitor the state of the software being trained on, and display or take appropriate action)

(e) Provide an automatic integration point with the learning management system (LMS), such that once the ES has detected that the student is unable to complete a certain requirement, the ES will automatically invoke the integrated LMS to explain what the student may not comprehend. This can be followed by automatically displaying the solution.

(f) Based on specific set of skill requirements tagged with each requirement, the smart agent reports (to virtual lab manager executing on the management node) the "time", "number of attempts", and "errors" related to the student performing each task. This enables the ES system to automatically assess the student skill level for student performance reports.

(g) Once a student is determined to be in need of developing certain skill set, the smart agent reports accordingly to virtual lab manager executing on the management node, which automatically recommends specific training sessions to the student.

(h) Posting student virtual training session progress using the social network services, such as Facebook® (a registered trademark of Facebook, Inc., Palo Alto, Calif.), Myspace® (a registered trademark of Myspace, Inc., Beverly Hills, Calif.), Twitter® (a registered trademark of Twitter, Inc., San Francisco, Calif.), LinkedIn® (a registered trademark of LinkedIN, Ltd., Mountain View, Calif.), etc., to enlist collaboration and help for the student. For example, an authorized social network viewer of the student's virtual training session progress may provide advice or log into the running virtual training environment to actively collaborate in the virtual training session.

Figure 6:
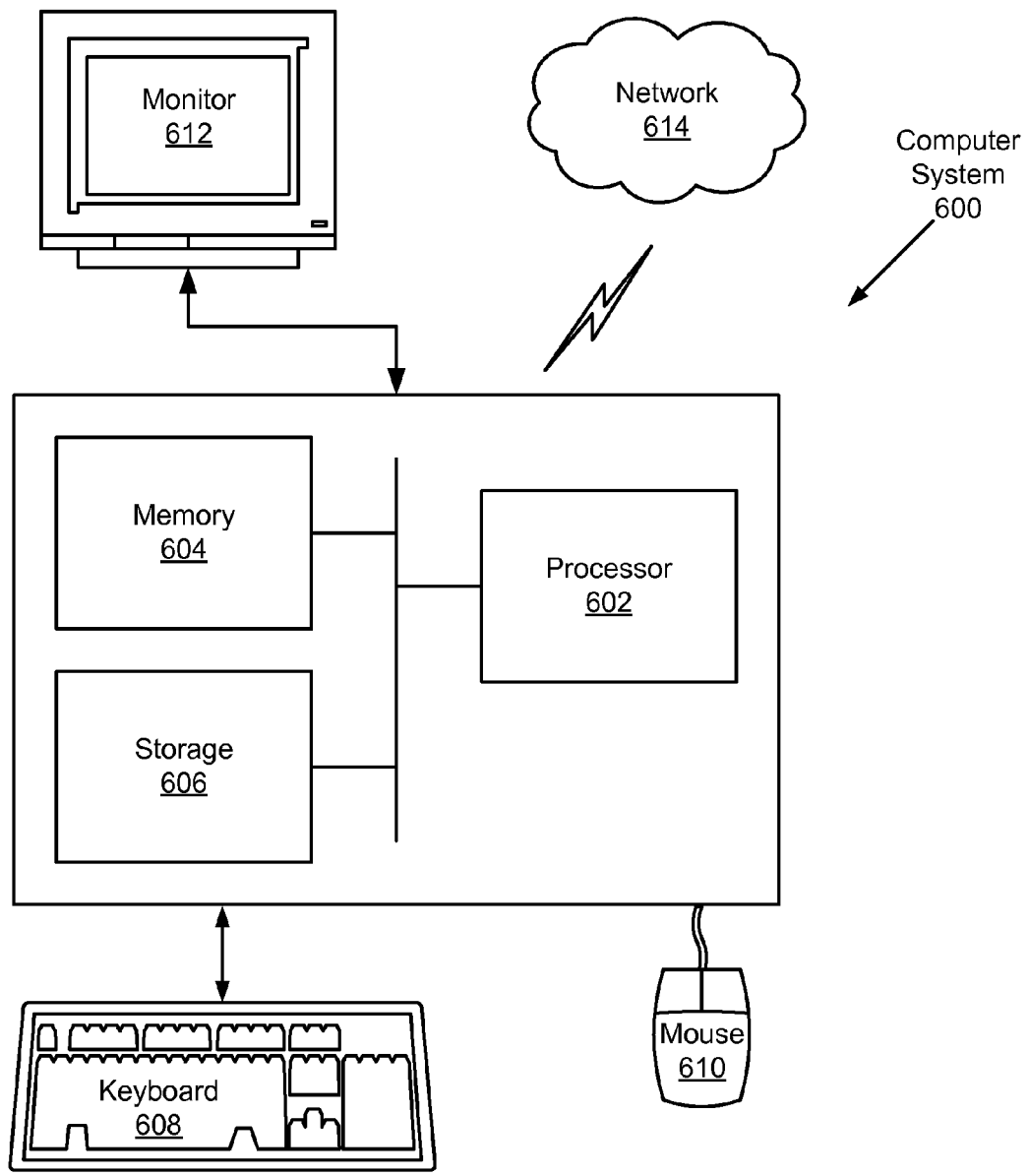
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (602) is a hardware component, such as an integrated circuit. The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., management node, hardware resource node, student node, instructor node, and components thereof) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored, temporarily or permanently, on a tangible computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conducting a virtual training session using a virtual machine, comprising:
   identifying the virtual training session comprising a first training objective having a first validation path and a second training objective having a second validation path;
   receiving, by a processor of a computer via an instructor user interface (UI), an input to select a graphical icon in a validator library;
   inserting the graphical icon as a validator node in a graph specifying at least the first validation path, wherein the first validation path comprises a validator represented by the graphical icon and corresponding to an event of the virtual machine;
   configuring, by the processor, the virtual machine to conduct the virtual training session, wherein the virtual machine is manipulated by a student of the virtual training session to complete the first training objective;
   configuring, by the processor, a smart agent to execute on the virtual machine;
   performing a validation check of the virtual training session, wherein performing the validation check comprises using the validator to determine that the event of the virtual machine has occurred;
   generating a result of the validation check;
   identifying, using the smart agent, completion of the first training objective based on the result; and
   advancing, by the processor, the virtual training session from the first training objective to the second training objective in response to identifying completion of the first training objective.

2. The method of claim 1,
wherein completion of the first training objective comprises at least one selected from a group consisting of a state of the virtual machine meeting a first pre-determined criterion and an answer of the student to a question meeting a second pre-determined criterion.

3. The method of claim 2, further comprising:
receiving, from an instructor, the first training objective,
wherein the graph represents the training session and comprising a first node corresponding to the first training objective and a second node corresponding to the second training object, wherein the first node is coupled to the validator node.

4. The method of claim 1,
wherein the virtual machine comprises at least one selected from a group consisting of a configuration file, a registry entry, a database, and a disk volume, and
wherein the event comprises at least one selected from a group consisting of a system service, a file change, a registry change, a monitor window, and completion of a training requirement.

5. The method of claim 1, further comprising:
initiating, using the smart agent, an operation of the virtual machine based on the result, wherein the operation comprises at least one selected from a group consisting of running a configuration tool, modifying a file, modifying a registry, modifying a database, and modifying a disk volume.

6. The method of claim 1, further comprising:
modifying, using the smart agent, a configuration of an underlying hardware resource of the virtual machine based on the result.

7. The method of claim 1, further comprising:
detecting, using the smart agent, a progression of the virtual machine into a critical state following manipulation of the virtual machine by the student to meet the first training objective; and
performing, using the smart agent and in response to detecting the progression of the virtual machine into the critical state, at least one selected from a group consisting of initiating an operation of the virtual machine, and modifying a configuration of an underlying hardware resource of the virtual machine.

8. The method of claim 1, further comprising:
restoring, using the smart agent, the virtual machine based on a template,
wherein the virtual machine is manipulated by the student to complete the second training objective after restoring.

9. The method of claim 8, further comprising:
capturing a student modified state of the virtual machine in response to the student manipulating the virtual machine to complete the first training objective,
wherein the template comprises at least one selected from a group consisting of the student modified state of the virtual machine and a system configuration configured based on the virtual training session.

10. The method of claim 1, further comprising:
receiving, by the processor via the instructor UI, a logic rule to assign to the validator;
determining, using the smart agent, that the student fails to complete the second training objective within a pre-determined time period;
generating, using the smart agent and in response to the determining, hint information for providing to the student, wherein the hint information comprises a context-aware message generated according to the logic rule;
detecting, using the smart agent, a lack of progress by the student after providing the hint information to the student;

advancing, by the processor and in response to the detecting, a state of the virtual machine to complete a task required by the second training objective; and displaying the state of the virtual machine, while the state is being advanced, to be viewed by the student as a simulation of the student completing the task required by the second training objective.

11. A system for conducting a virtual training session, comprising:

a hardware resource node configured to:
  implement a virtual machine; and
  execute a smart agent on the virtual machine;

an instructor node comprising a computer processor, operatively coupled to the hardware resource node, and configured to:
  identify the virtual training session comprising a first training objective having a first validation path and a second training objective having a second validation path;
  receive, via an instructor user interface (UI), an input to select a graphical icon in a validator library; and
  insert the graphical icon as a validator node in a graph specifying at least the first validation path, wherein the first validation path comprises a validator represented by the graphical icon and corresponding to an event of the virtual machine; and a management node operatively coupled to the instructor node and configured to:
  configure the virtual machine to conduct the virtual training session, wherein the virtual machine is manipulated by a student of the virtual training session to complete the first training objective;
  configure the smart agent to execute on the virtual machine;
  perform a validation check of the virtual training session, wherein the validation check is performed by at least the validator to determine that the event of the virtual machine has occurred;
  generate a result of the validation check;
  identify, using the smart agent, completion of the first training objective based on the result; and
  advance the virtual training session from the first training objective to the second training objective in response to identifying completion of the first training objective.

12. The system of claim 11, further comprising:
a student node operatively coupled to the management node and configured to:
  manipulate, in response to a command of the student, the virtual machine to complete the first training objective.

13. The system of claim 11,
the instructor node further configured to:
  generate the first training objective,
  wherein the graph represents the training session and comprises a first node corresponding to the first training objective and a second node corresponding to the second training object, wherein the first node is coupled to the validator node.

14. The system of claim 11, wherein completion of the first training objective comprises at least one selected from a group consisting of a state of the virtual machine meeting a first pre-determined criterion associated with the first node and an answer of the student to a question meeting a second pre-determined criterion associated with the first node.

15. The system of claim 11,
wherein the virtual machine comprises at least one selected from a group consisting of a configuration file, a registry entry, a database, and a disk volume, and
wherein the event comprises at least one selected from a group consisting of a system service, a file change, a registry change, a monitor window, and completion of a training requirement.

16. The system of claim 11, wherein the management node is further configured to:
initiate, using the smart agent, an operation of the virtual machine based on the result, wherein the operation comprises at least one selected from a group consisting of running a configuration tool, modifying a file, modifying a registry, modifying a database, and modifying a disk volume.

17. The system of claim 11, wherein the management node is further configured to:
modify, using the smart agent, a configuration of an underlying hardware resource of the virtual machine based on the result.

18. The system of claim 11, wherein the management node is further configured to:
detect, using the smart agent, a progression of the virtual machine into a critical state following manipulation of the virtual machine by the student to meet the first training objective; and
perform, using the smart agent and in response to detecting the progression of the virtual machine into the critical state, at least one selected from a group consisting of initiating an operation of the virtual machine, and modifying a configuration of an underlying hardware resource of the virtual machine.

19. The system of claim 11, wherein the management node is further configured to:
restore the virtual machine based on the template,
wherein the virtual machine is manipulated by the student to complete the second training objective after restoring.

20. The system of claim 19,
wherein the template comprises a at least one selected from a group consisting of a system configuration configured based on the virtual training session and a student modified state of the virtual machine as a result of the student manipulating the virtual machine to complete the first training objective, and
wherein the student modified state of the virtual machine is captured using the smart agent.

21. The system of claim 11, wherein the instructor node is further configured to:
receive, via the instructor UI, a logic rule to assign to the validator;
determine, using the smart agent, that the student fails to complete the second training objective within a pre-determined time period;
generate, using the smart agent and in response to the determining, hint information for providing to the student, wherein the hint information comprises a context-aware message generated according to the logic rule;
detect, using the smart agent, a lack of progress by the student after providing the hint information to the student;
advance, in response to the detecting, a state of the virtual machine to complete a task required by the second training objective; and display the state of the virtual machine, while the state is being advanced, to be viewed by the student as a simulation of the student completing the task required by the second training objective.

22. A non-transitory computer readable storage medium comprising a plurality of instructions for conducting a virtual training session using a virtual machine, the plurality of instructions comprising functionality to:

identify the virtual training session comprising a first training objective having a first validation path and a second training objective having a second validation path;

receive, via an instructor user interface (UI), an input to select a graphical icon in a validator library;

insert the graphical icon as a validator node in a graph specifying at least the first validation path, wherein the first validation path comprises a validator represented by the graphical icon and corresponding to an event of the virtual machine;

configure the virtual machine to conduct the virtual training session, wherein the virtual machine is manipulated by a student of the virtual training session to complete the first training objective;

configure a smart agent to execute on the virtual machine;

perform a validation check of the virtual training session, wherein the validation check is performed by at least the validator to determine that the event of the virtual machine has occurred;

generate a result of the validation check;

identify, using the smart agent, completion of the first training objective based on the result; and advance the virtual training session from the first training objective to the second training objective in response to identifying completion of the first training objective.

23. The non-transitory computer readable storage medium of claim 22, wherein the plurality of instructions further comprise functionality to:

receive, via the instructor UI, a logic rule to assign to the validator;

determine, using the smart agent, that the student fails to complete the second training objective within a predetermined time period;

generate, using the smart agent and in response to the determining, hint information for providing to the student, wherein the hint information comprises a context-aware message generated according to the logic rule;

detect, using the smart agent, a lack of progress by the student after providing the hint information to the student;

advance, in response to the detecting, a state of the virtual machine to complete a task required by the second training objective; and display the state of the virtual machine, while the state is being advanced, to be viewed by the student as a simulation of the student completing the task required by the second training objective.

* * * * *